United States Patent
Bennett

(10) Patent No.: US 7,614,880 B2
(45) Date of Patent: Nov. 10, 2009

(54) METHOD AND APPARATUS FOR A PHONEME PLAYBACK SYSTEM FOR ENHANCING LANGUAGE LEARNING SKILLS

(76) Inventor: James Bennett, 380 Myrtle, Laguna Beach, CA (US) 92651

( * ) Notice: Subject to any disclaimer, the term of this patent is extended or adjusted under 35 U.S.C. 154(b) by 1029 days.

(21) Appl. No.: 10/679,090

(22) Filed: Oct. 3, 2003

(65) Prior Publication Data

US 2004/0067471 A1 Apr. 8, 2004

Related U.S. Application Data

(60) Provisional application No. 60/415,884, filed on Oct. 3, 2002.

(51) Int. Cl.
*G09B 19/00* (2006.01)
(52) U.S. Cl. ................... 434/167; 434/156; 434/157; 434/159; 434/169
(58) Field of Classification Search ............... 434/157, 434/159, 167, 156
See application file for complete search history.

(56) References Cited

U.S. PATENT DOCUMENTS

| | | | | |
|---|---|---|---|---|
| 5,314,336 A | * | 5/1994 | Diamond et al. | 434/169 |
| 5,752,227 A | * | 5/1998 | Lyberg | 704/235 |
| 6,554,616 B1 | * | 4/2003 | Love | 434/157 |
| 6,572,431 B1 | * | 6/2003 | Maa | 446/301 |
| 2002/0137013 A1 | * | 9/2002 | Nichols | 434/157 |

* cited by examiner

*Primary Examiner*—James S. McClellan
*Assistant Examiner*—Sunit Pandya
(74) *Attorney, Agent, or Firm*—McAndrews, Held & Malloy, Ltd.

(57) ABSTRACT

Certain aspects of the invention may be found in a method and apparatus for aiding language pronunciation. In an aspect of the invention, based on at least one triggering event, an audio enabled toy such as a babble bear may be adapted to play back phonemes and/or lingos comprising sounds, including words, phrases and sentences. The phonemes and/or lingos may cover a wide range of phonemes from a variety of languages, thereby exercising the hearing ability of infants and toddlers and enhancing their ability to learn new languages. Phoneme sequences and lingo sequences, or a combination thereof, may be retrieved from one or more removable storages within the toy and selectively played back within the audio enabled toy. Libraries of phonemes and lingo can be downloaded from servers, personal computers and remote storage.

30 Claims, 9 Drawing Sheets

METHOD AND APPARATUS FOR A PHONEME PLAYBACK SYSTEM FOR ENHANCING LANGUAGE LEARNING SKILLS

CROSS-REFERENCE TO RELATED APPLICATIONS/INCORPORATION BY REFERENCE

This application makes reference to, claims priority to, and claims the benefit of: U.S. Provisional Application Ser. No. 60/415,884 filed on filed Oct. 3, 2002.

The above stated application is incorporated herein by reference in its entirety.

FIELD OF THE INVENTION

Certain embodiments of the invention relate to foreign language phoneme recognition. More specifically, certain embodiments of the invention relate to a method and apparatus for a phoneme playback system for enhancing language learning skills.

BACKGROUND OF THE INVENTION

The world's languages contain about 869 phonemes comprised of 558 consonants, 260 vowels and 51 diphthongs. American English utilizes 52 phonemes while the Kalahari Desert language !Xũ holds the record at 141. Until the age of six to eight months, infants are able to distinguish all 859 phonemes. At about that time, the infant brain begins to sort the phoneme sounds into a much smaller subset based on exposure to its native language. As a single lingual adult, the brain is "tuned" to readily distinguish one phoneme from another in its native language but often fails to do so when exposed to foreign phonemes.

Similarly, from about 6 to 7 months of age, babies begin to babble in early attempts to enunciate native language phonemes. In doing so, babies begin the process of tuning their brain's control over their vocal tracks to support the native language. The brain of a single lingual adult also readily pronounces all native language phonemes but often cannot correctly pronounce foreign phonemes.

Studies indicate that the ability to "tune" the brain to pronounce and distinguish phonemes diminishes after six months of age. By adulthood, many find it nearly impossible to change their tuning to fully support another language. This is reflected in the fact that children have far less difficulty than adults when learning and speaking a second language. Furthermore, this often occurs without native language accents.

If a foreign phoneme is similar but differs slightly from a native phoneme, a tuned brain often fails to readily distinguish or speak the foreign phoneme, instead substituting the native phoneme in the process. An example of this process can be appreciated when a listener who understands only native Japanese hears the American English word "river." The Japanese listener typically cannot readily distinguish the non-Japanese /ri/ sound from a native /li/ sound and may hear something closer to "liver." When asked to repeat the word, the Japanese listener having no vocalization training to speak the /ri/ phoneme will also say "liver."

With intense, repetitive correction, a child's brain may "retune" to distinguish foreign phonemes and adapt to accommodate corresponding vocal track control. Because of the nature of brain development, after eight or ten years of age, foreign language facility is dramatically harder to acquire. Accordingly, attempts to retune an adolescent or adult brain may be quite difficult and may often fail.

With insufficient retuning of a foreign speaker's brain, native listeners may perceive foreign language accents. Such accents themselves may be difficult for the native listener to understand. When the foreign language speaker substitutes a similar foreign phoneme having no direct native counterpart, the native listener's brain may similarly mischaracterize the foreign phoneme. If contextual and grammatical queues fail, the native listener may find the foreign speaker incomprehensible.

Currently, there are nearly 7000 world languages. The top 100 are native to nearly 90% of the world's populace, while the top 10 are spoken by over 50%. Of the top 10 languages, many share a large number of common phonemes. This is especially true when languages share a common origin.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or apparatus for a phoneme playback system for aiding language pronunciation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and apparatus for aiding language pronunciation. An aspect of the apparatus for aiding language pronunciation may comprise a trigger unit within an audio enabled toy that receives at least one event and an audio processing unit that selects from within the audio enabled toy, a phoneme and/or a lingo from a first removable storage of the audio enabled toy that corresponds to the received event. The phoneme and/or lingo may be associated with a first language. The received event may be at least one of a motion trigger, a sound trigger and a button trigger. An audio representation of the selected phoneme and/or lingo may be generated within the audio enabled toy by the audio processing unit. The generated audio representation of the selected phoneme and/or lingo may be played from within the audio enabled toy by the audio processing unit.

Figure 1:
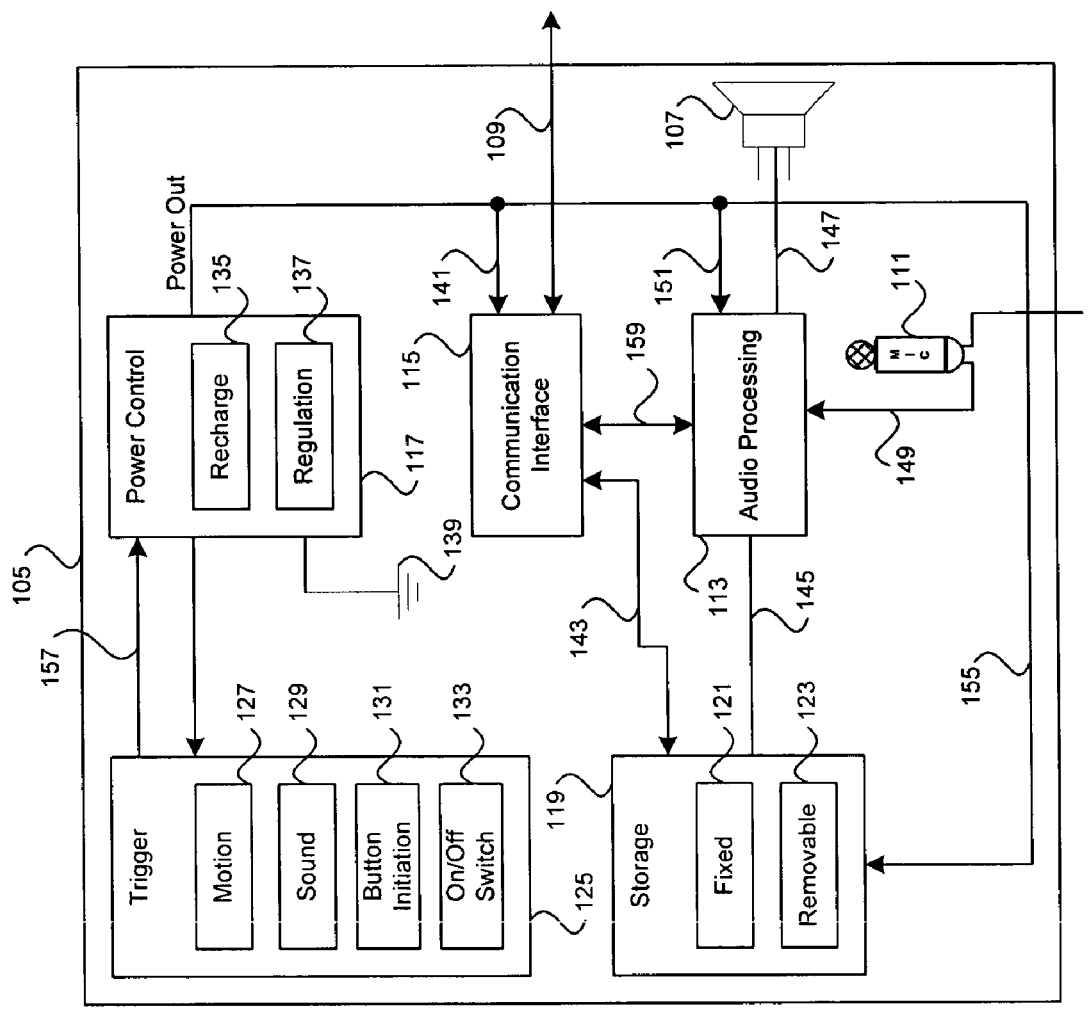
FIG. 1 is block diagram of an exemplary phoneme playback system capable of selectively generating audio outputs in accordance with an embodiment of the invention.

FIG. 1 is block diagram of an exemplary phoneme playback system 105 capable of selectively generating audio outputs in accordance with an embodiment of the invention. Referring to FIG. 1, the exemplary phoneme playback system 105 may comprise a storage unit 119, an audio processing unit 113, a communication interface 115, a trigger unit 125, a microphone 111, a power control unit 117 and a speaker unit 107. In an embodiment of the invention, at least some of the functionality of the storage unit 119, audio processing unit 113, communication interface 115, trigger unit 125, power control unit 117 and the speaker unit 107 may be embodied in one or more semiconductor chips.

The storage unit 119 may comprise a fixed storage unit 121 and/or a removable storage 123. The fixed storage unit 121 may be, for example, a volatile memory such as a RAM module or a nonvolatile memory such as a ROM, an EEPROM or a FLASH memory or a combination thereof. The volatile and/or nonvolatile memory may be embodied in one or more semiconductor chips. In an aspect of the invention, the nonvolatile memory may be utilized to store operational code such as code for a speech processing engine for the audio processing unit 113 and configuration data and operating code for the phoneme playback system 105. The volatile memory may be utilized during operation of the phoneme playback system 105 to temporarily store operating code and data. A portion of the volatile memory may be designated as a cache memory.

The removable storage 123 may be a memory card such as a compact FLASH, secure digital (SD) card or other memory card and may be adapted to store various algorithms and/or phoneme data and code for the phoneme playback system 105. In this regard, various types of memory cards may be plugged into the phoneme playback system 105, each of which may be adapted to process phonemes corresponding to a particular language. However, the invention is not limited in this regard and various language dependent phonemes may also be stored in the fixed storage unit or block 121. The storage unit 119 may be coupled to the communication interface 115, the audio processing unit 113 and the power control unit 117 via connections 143, 145 and 155, respectively.

The audio processing unit 113 may be a speech processing engine (SPE) and/or a suitable audio processing chip that may be adapted to retrieve, process and generate audio signals. The speech processing engine may include suitable hardware and/or code that may be capable of speech recognition. The audio processing unit 113 may be coupled to the storage unit 119, the communication interface 115, the speaker unit 107, the microphone 111 and the power control unit 117. The processing of audio signals may comprise retrieving phoneme related data and/or code from the storage unit 119 and comparing an audio input with the retrieved phoneme related data. The received input may be derived from, for example, the microphone 111. Accordingly, a corresponding phoneme having similar audio characteristics to the audio input may be selected and played back by the phoneme playback system 105 through, for example, the speaker unit 107 or an external audio player not shown.

The communication interface 115 may include a wired and/or wireless interface that may be adapted to receive data from a source external to the phoneme playback system 105 or transfer data to a destination that may be external to the phoneme playback system 105. The wired communication interface may be, for example, a parallel interface, a serial interface or other suitable data transfer interface. In this regard, the wired communication interface may be, for example, a universal serial bus (USB) or an IEEE 1394 Firewire interface. External systems may be coupled to the wired communication interface via at least one connection 109. The wireless communication interface may be, for example, Bluetooth or an 802.11x based wireless protocol such as 802.11a, 802.11b and/or 802.11g. The wireless communication interface may also be embodied in an Infrared communication interface. Notwithstanding, the communication interface 115 may be coupled to the audio processing unit 113, the storage unit 119 and the power control unit 117. In this regard, the communication interface 115 may be powered by the power control unit 117.

In an embodiment of the invention, the communication interface 115 may be adapted to facilitate download of phoneme information and/or other information to the storage unit 119 from external systems over the Internet via, for example, the Bluetooth or 802.11x compatible interface. The communication interface may be further adapted to utilize protocols such as file transfer protocol (FTP), hypertext transfer protocol (HTTP) and/or other suitable protocols, whether standardized or non-standardized, to receive and/or transmit data. In this regard, the phoneme playback system 105 may include suitable code and/or hardware that may be adapted to implement a built-in browser that may handle various file transfer protocols. Accordingly, the browser may be configured to provide an interface that may be adapted to facilitate communication setup of the phoneme playback system 105. The phoneme playback system 105 may also be configured so that it has a unique identifier such as an electronic serial number or identification (ID), and/or a MAC address that may be utilized to facilitate communication via the Internet or other communication network.

The trigger unit 125 may comprise a motion trigger unit 127, a sound trigger unit 129, a button initiation trigger unit 131 and an on/off switch unit 133. The motion trigger unit 127 may be an off the shelf motion sensor device such as a pyroelectric infrared motion detector or sensor. The sound trigger unit 129 may be a piezoelectric device, which may also be an off the shelf device. The sensitivity of a motion trigger unit 127, sound trigger unit 129 and the button initiation trigger unit may be variably adjusted to achieve a range of sensitivity in accordance with an embodiment of the invention. Circuitry and/or logic for at least a portion of the components comprising the trigger unit 125 may be embodied in a single chip, although the invention is not so limited.

Power may be supplied to the trigger unit 125 by the power control unit 117 via connection 161 and connection 157 may provide, for example, a pulse voltage and/or current from the trigger unit 125 to the power control unit 177. In an embodiment of the invention, the trigger mechanism 125 may be adapted to generate a triggering signal that may be transferred via connection 157 to the power control unit 117. The trigger unit 125 may also be adapted to respond to or be triggered by at least one event. Exemplary triggering events may include, but are not limited to, motion of the phoneme playback system 105 or a change thereof that may be sensed by the motion trigger unit 127 and sound input selectively received via the microphone 111 that is processed by the audio processing unit 113 and/or detected by the sound trigger unit 129. Other exemplary triggering events may also include, but are not limited to, a button initiation event received by the button initiation trigger 131 and an on/off switch 133 that may be adapted to activate or deactivate specific functions of the phoneme playback system. Accordingly, the processing of phoneme information by the audio processing unit 113 and the selected playback of stored phoneme information by the speaker unit 107 may be triggered by one of these events. Once an event occurs, the audio processing unit 113 may execute a corresponding function thereby resulting in playback of the phoneme via the speaker 107.

The microphone 111 may be coupled to the audio processing unit 113 via connection 149. The microphone 111 may be integrated within the phoneme playback system 105 or it may be externally coupled to the phoneme playback system 105 via a connection to the audio processing unit 113. In an externally coupled arrangement, the microphone 111 may be plugged into a standardized or non-standardized jack that may be coupled to the audio processing unit 113 and brought to the outer surface of the phoneme playback system 105.

The power control unit 117 may include a rechargeable unit 135, a power regulation unit 137 and a ground connection 139. In one aspect of the invention, the power control unit 117 may be, for example, a battery that may be adapted to supply the required power to at least some of the units within the phoneme playback system 105. In this regard, the power control unit 117 may be adapted to supply, for example, a voltage that may be a multiple of 1.5 volts so that the phoneme playback system 105 may utilize a standard battery. Accordingly, the power control unit 177 may supply a suitable voltage such as 1.5V, 3V, 6V or 9V and current to the storage unit 119, the audio processing unit 113, the communication interface 115, the trigger unit 125 and the microphone 111. The power control unit 117 may supply suitable voltage and current to the storage unit 119, the audio processing unit 113, the communication interface 115, and the trigger unit 125 via connections 143, 147, 141 and 161, respectively.

In another aspect of the invention, the power control unit 117 may be a transformer or voltage adapter that may be adapted to receive power from an alternating current source and convert the alternating current to a direct current (DC) voltage. The DC current may be utilized to supply a suitable voltage and current to each of the storage unit 119, the audio processing unit 113, the communication interface 115, the trigger unit 125 and the microphone 111. In a case where the power control unit 117 is a transformer or voltage adapter, the power regulation unit 137 may comprise suitable voltage and current conditioning circuitry for providing an appropriate voltage to the storage unit 119, the audio processing unit 113, the communication interface 115, the trigger unit 125 and the microphone 111.

In an embodiment of the invention, the power control unit 117 may also be configured to supply a voltage to at least one device that may be external to the phoneme playback system 105. In this regard, the device coupled to the phoneme playback system 105 may be a peripheral device such as a printer or a recording device. The device may also be an adjunct processing module that may be coupled to an interface of the phoneme playback system 105 in order to provide a supplemental function. In this regard, the adjunct processing module may receive signals from the phoneme playback system 105, process these signals and provide the processed signals back to the phoneme playback system 105.

The rechargeable unit 135 of the power control unit 117 may be configured to recharge, for example, the battery in instances where a voltage of the battery falls below a certain level. In another aspect of the invention, the rechargeable unit may be adapted to constantly provide a charging voltage to the battery to ensure that the battery has sufficient charge to operate the phoneme playback system 105 without power from an external source.

The speaker unit 107 may comprise a speaker configured in a monaural or stereo mode or other enhanced audio processing mode. The speaker unit 107 may be coupled to the audio processing unit 113. Accordingly, digital and/or analog signals processed by the audio processing unit 113 may be played back and heard via the speaker unit 107. The speaker unit 107 may be integrated within the phoneme playback system 105 and may also be optionally coupled to the audio processing unit 113 via a connector that may be integrated on the surface of the phoneme playback system 105. The speaker unit 107 may also include suitable audio conditioning and/or amplification circuitry that may be adapted to condition and/or amplify audio signals that may be received from the audio processing unit 113 to provide an enhanced sound quality and listening experience.

In operation, phoneme information may typically be retrieved from the storage unit 119 and may be processed by the audio processing unit 113 before being consumed or played back via the speaker unit 107. The communication interface 115 facilitates selective communication with external systems via communication link 109, which may result in the transfer of data, such as phoneme information, to the storage unit 119 and/or to the audio processing unit 113. The audio processing unit 113 may also be configured to selectively control the storage of the transferred data in the storage unit 119 or in an external storage unit that may be coupled via the communication interface 115.

In accordance with an embodiment of the invention, the selective processing of phoneme information by the audio processing unit 113 and the selective playback of stored phoneme information by the speaker unit 107 may be triggered by one of several possible events. For example, the motion of the phoneme playback system 105, which may be sensed by the motion trigger 127 may trigger the processing of information by the audio processing unit. Also, sound input selectively received via the microphone 111, which may be processed by the audio processing unit 113 and/or detected by the sound trigger 129 may also cause the audio processing unit 113 to selectively process phoneme information. Additionally, a button initiation event received by the button initiation trigger 131 or a depression or toggling of the on/off switch 133 may activate or deactivate specific functions of the phoneme playback system 105, thereby initiating or terminating various operations of the audio processing unit 113.

Accordingly, when in operation, the phoneme playback system 105 may receive one or more of the triggering events, for example, motion, sound, button initiation and/or a switch event. In response to receiving at least one of these events, the phoneme playback system 105 may selectively retrieve specific phoneme information from the storage unit 119. The retrieved information may be processed by the audio processing unit 113 and the audio processing unit may produce an output signal that may cause the speaker unit 107 to play an aural representation of the retrieved and processed phoneme information. The duration for which the speaker unit 107 plays the representation of the retrieved and processed phoneme information and the volume at which it is played back may be selectively specified by a user. If none is specified by the user, then a default value may be determined and utilized by the phoneme playback system 105. Accordingly, in one aspect of the invention, a volume of the playback may be optionally adjusted by a user of the phoneme playback system 105. Other parameters that may be specified by the user and/or determined by the phoneme playback system 105 may include a choice of phoneme delivery, a speed of delivery and a variety mode. The choice of phoneme delivery mode may comprise male, female, child, for example. The speed of delivery may comprise, fast, medium and slow, for example. Notwithstanding, the speed may be variably selected, for example, utilizing a variable resistance sliding switch, rotary switch or button. The variety mode may comprise a repetitive set of phonemes or random generation of phonemes, for example.

The phoneme playback system 105 may further be adapted to facilitate the playback of "babble-like" sounds that infants can hear, thus exercising their hearing faculties and making it possible for infants to retain the ability to distinguish various human generated sounds and/or phonemes. In addition, the sounds generated or played back by the phoneme playback system 105 may be upgraded to include "lingo." Lingo may include complete words, phrases and/or sentences that may aid with exercising language skills in, for example, infants and toddlers, and in general, teaching children necessary language skills. The capability to upgrade the phoneme playback system 105 may be facilitated by the communication interface 115. In this regard, libraries of phonemes and libraries of words and/or phrases for different languages may be downloaded to the storage unit 119 from external systems. In another embodiment of the invention, supplemental modules containing the libraries may be interfaced to the phoneme playback system 105 via the communication interface connection 109.

Figure 2:
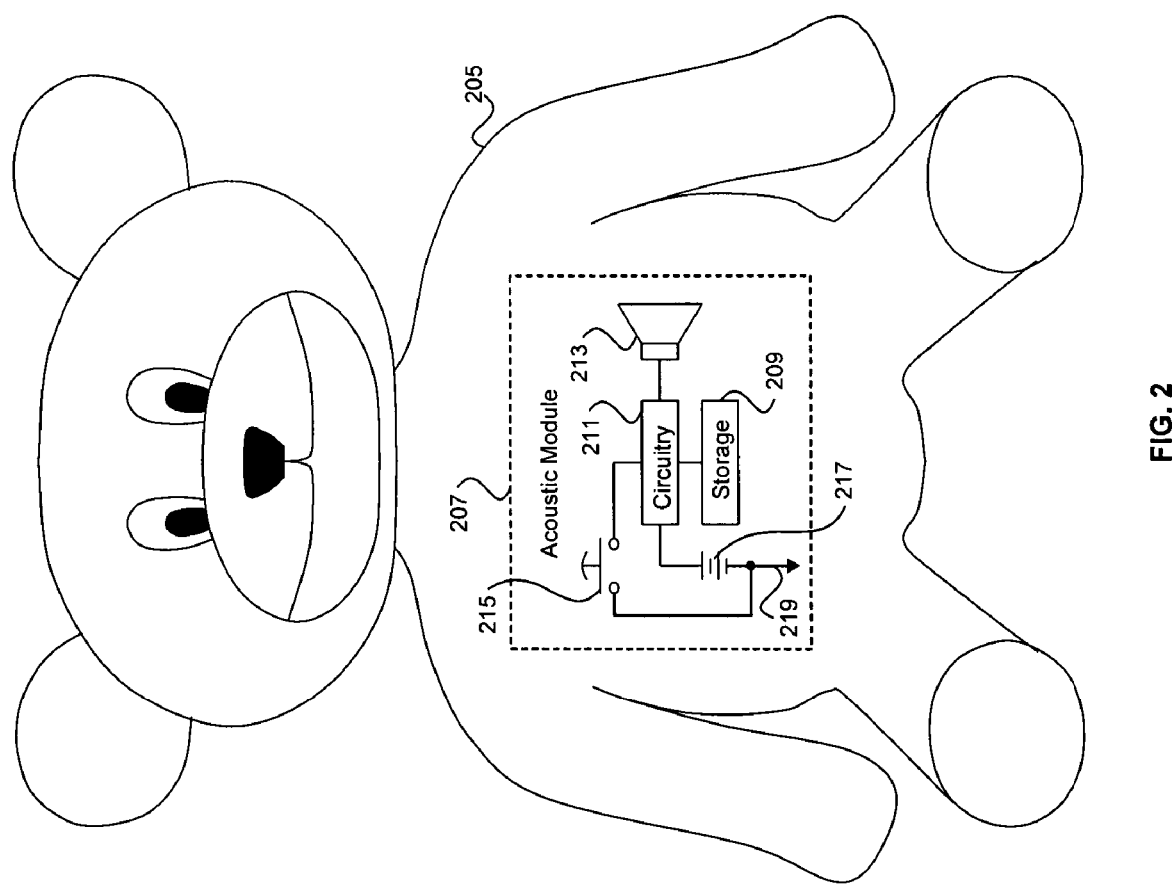
FIG. 2 is a block diagram of the phoneme playback system of FIG. 1 that is embedded as an acoustic module in a toy bear in accordance with an embodiment of the invention.

FIG. 2 is a block diagram of the phoneme playback system 105 of FIG. 1 that is embedded as an acoustic module 207 in a toy bear 205 in accordance with an embodiment of the invention. Although a toy bear is illustrated, the invention is not so limited and other types of toys or housings may be utilized. Referring to FIG. 2, the acoustic module 207 may comprise circuitry 211, storage 209, speaker 213, contact control unit 215 and voltage source 217. Voltage source 217 may include a suitable ground 219. A storage unit 209 and a speaker unit 213 may be communicatively coupled to the circuitry 211. The circuitry 211 may be selectively coupled to a power unit 217 via a contact control unit 215 that may easily be controlled by a user such as a child.

A user, such as a child, can easily activate the acoustic module 215 by pressing on the top of the contact control unit 215 causing the power to be supplied to the circuitry 211 and also selectively activating the storage 209 and the speaker 215. In response, the circuitry 211 may selectively retrieve phoneme related information and other information such as operational code and/or data from the storage unit 209, processes it, and generates a corresponding audio signal. The corresponding audio signal generated by the circuitry 211 may be selectively communicated to the speaker unit 213 for playback. The speaker unit 213 may then produce an aural representation of the audio signal corresponding to the selected phoneme related information. In one aspect of the invention, playback of the processed phoneme information may be achieved using either default settings or user supplied settings. These settings may include, but are not limited to, a choice of phoneme delivery, a speed of delivery and a variety mode. For example, in a case where the user is a female child, these settings may include female for choice of delivery, slow for speed of delivery and repetitive for variety mode.

Figure 3:
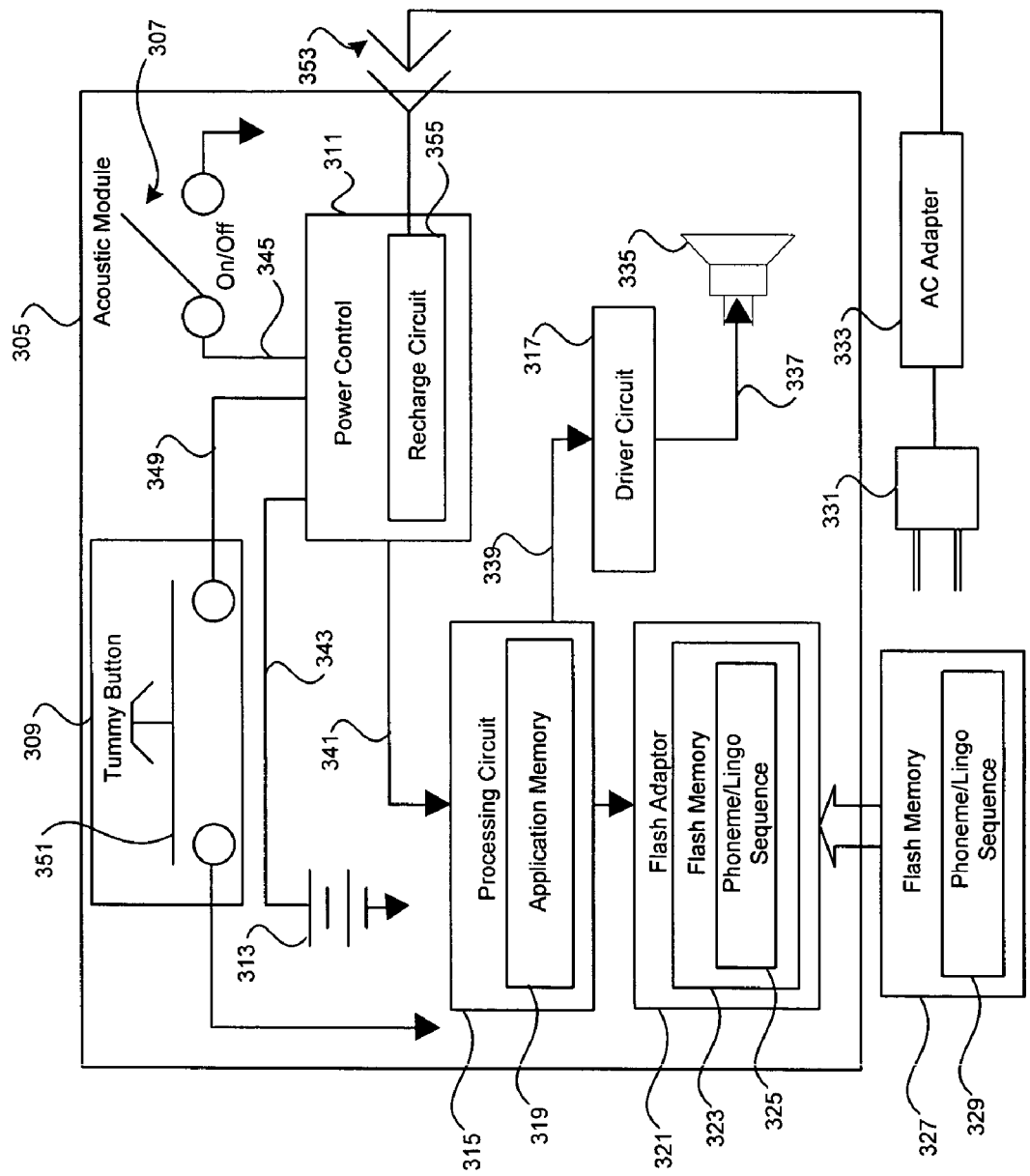
FIG. 3 is a block diagram of an acoustic module, which that may be utilized in a toy, for example, that is capable of receiving and processing flash memory cards, which contains a lingo sequence, and may be plugged in a flash adapter, in accordance with an embodiment of the invention.

FIG. 3 is a block diagram of an acoustic module 305, which may be utilized in a toy, for example, that is capable of receiving and processing flash memory cards 327, which contain a phoneme and/or lingo sequence 329, and may be plugged in a flash adapter 321, in accordance with an embodiment of the invention. Referring to FIG. 3, the acoustic module 305 may comprise an on/off switch 307, a tummy button switch 309, a power control unit 311 comprising a recharge circuit 355, a processing circuit 315 comprising an application memory 319, a driver circuit 317, a speaker unit 335 and a flash adapter 321. The power control unit 311 may be recharged by an AC adapter 333 having a corresponding plug 331. The processing circuit 315 may be communicatively coupled to the flash adapter 321 and the driver circuit 317.

The on/off switch 307 may be utilized to power up or power down the acoustic module 305. The tummy button switch 309 may be configured to make contact with the base of the on/off switch 307 and accordingly activate or deactivate playback of sounds such as phonemes and/or instructions. The power control unit 311 and recharge circuit 355 may be coupled to the on/off switch 307 and the tummy button 309. The acoustic module 305 may be activated by depressing the tummy button 309 so that the contact 351 is closed thereby permitting the power control unit 311 to supply a voltage to the acoustic module 305 in order to initiate playback of a particular phoneme.

In operation, the acoustic module 305 may be adapted to play phoneme information, such as a phoneme sequence 325, retrieved from the flash memory 323 via the flash adapter 321. The retrieved phoneme information may be selectively processed by the processing circuit 315. In another aspect of the invention, instructions may be stored in the flash memory 323 and may be retrieved from the flash memory 323 whenever necessary. In general, whenever the tummy button 309 is activated, the processing circuit 315 may retrieve a phoneme sequence 325 from a flash memory 323 such as a compact flash card that is plugged into the flash adapter 321. The retrieved phoneme may then be processed and communicated to the driver circuit 317 for playback through the speaker unit 335.

The lingo sequence 329 may be keyed to one or more lingo languages, which may be stored on a single memory card. In a case where more than one language may be supported on a single memory card, a particular language may be selected. Notwithstanding, in accordance with an aspect of the invention, different lingo sequences may be played back by employing a particular flash memory unit 327, such as compact flash cards. Each lingo sequence may be associated with one human language such as French, or with a language family such as South Indian/Dravidian language family. The flash adapter 321 may be configured to facilitate swapping of flash memories, such as the swapping of the flash memory 323 with a new flash memory 327, thus making it possible to playback phonemes from different languages having different phoneme sequences and/or lingo sequences.

The acoustic module 305 may also be adapted to support multiple flash adaptors 321. In this regard, more than one flash memory 323 can be simultaneously plugged into the acoustic module 305. Accordingly, the processing circuit 315 may retrieve phoneme sequences or lingo sequences from one or more flash memories 323 that may currently be plugged into the flash adaptors. Retrieval of the phoneme sequences from the flash memories 323 may be achieved by the processing circuit 315 based on user preferences, or system defaults or a combination thereof.

A phoneme sequence 325 may sometimes be a "babble-like" sequence of phonemes that are known to occur in a given language. Such a phoneme sequence may be appropriate for children of a certain specific age group, such as infants. A lingo sequence may typically be a sequence of common and basic words of a given language, appropriate for children of a certain specific age group, such as toddlers or pre-school children. The acoustic module 305 may be utilized to playback phoneme sequences that are appropriate to train the hearing and speaking abilities of infants as well as play back common and basic words, phrases and/or sentences in a given language that are appropriate for toddlers and pre-school children.

Figure 4:
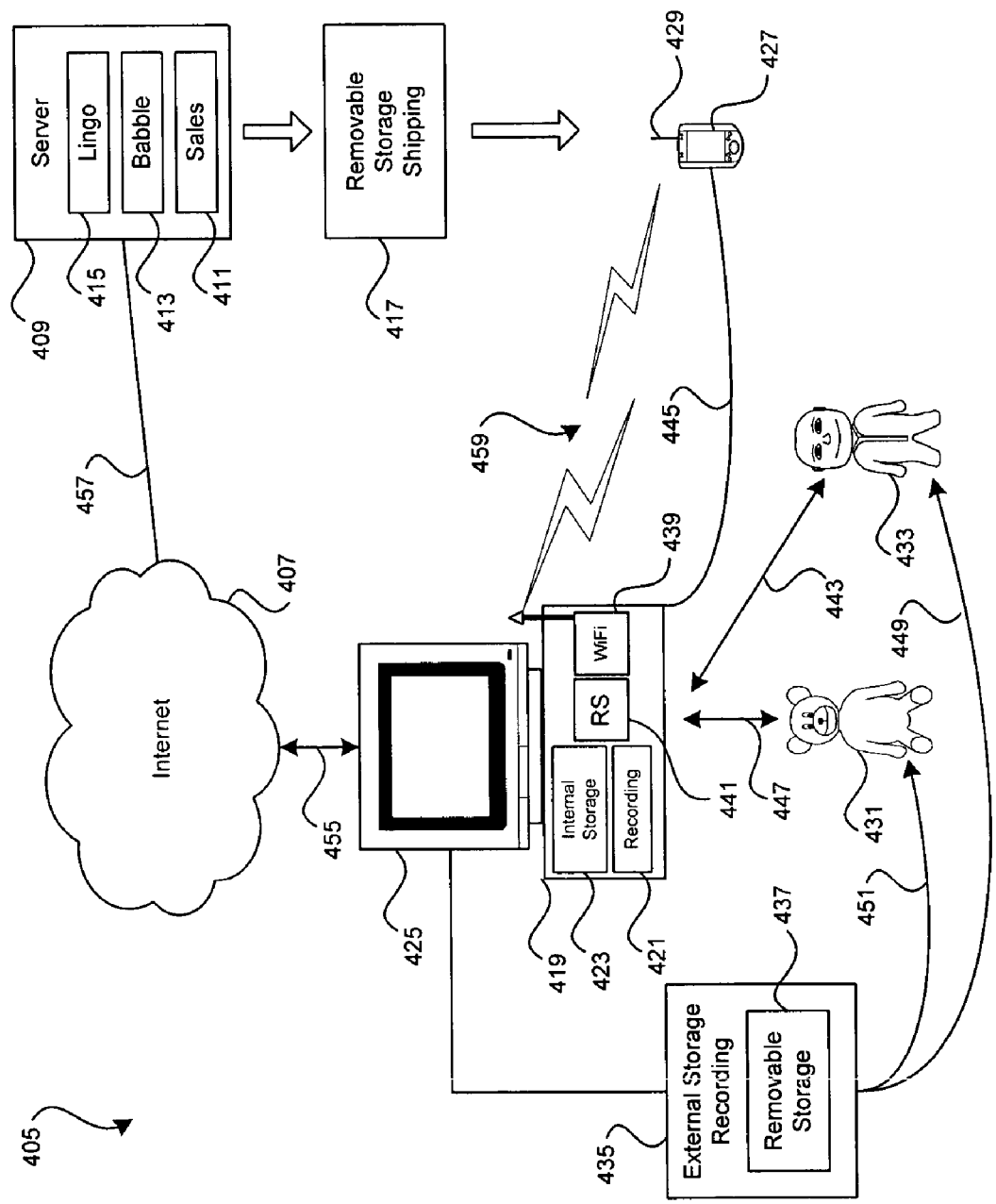
FIG. 4 is a block diagram of an auditory training network that may facilitate communication of phoneme sequences from a server to a user via the Internet and/ore via a computer communicatively coupled to the server, in accordance with various embodiments of the invention.

FIG. 4 is a block diagram of an auditory training network 405 that may facilitate communication of phoneme sequences from a server to a user via the Internet 407 and/or via a computer 419 communicatively coupled to the server 409, in accordance with various embodiments of the invention. Referring to FIG. 4, the auditory training network 405 may comprise a server 409, a computer 419, an external storage and recording unit or block, a removable storage shipping 417 and a wireless communication device 427. The auditory training network 405 may also include a first toy 431 resembling a bear and a second toy 433 resembling a human. The personal computer 419 may also include a monitor or display 425.

The server 409 may contain a lingo repository 415, a babble repository 413 and a sales unit 411. The computer 419 may comprise an internal storage 423, a recording unit 421, a removable storage (RS) adapter 441 and a wireless communication interface 439. The internal storage 423 may be a hard disk drive, the recording unit 421 may be a CD/RW drive and the removable storage (RS) adapter 441 may be a USB interface, for example. The interface may also be adapted to receive compact flash media, secure digital (SD) media and memory stick™ media, for example.

The sales unit 411 may be utilized to facilitate the sale of information located within the server 409 to end users. An end user, for example, may employ the computer 419 to purchase babble or lingo from the server 409 and the purchased babble or lingo may be downloaded to the end user's computer 419. In accordance with another embodiment of the invention, lingo or babble purchased by an end user utilizing the personal computer 419 may be shipped to the purchasing end user by the removable storage shipping unit 417. The external storage recording unit 435 may include a removable storage 437 and may be communicatively coupled to the computer 419.

The personal computer 419 may be selectively utilized to write information, for example, phoneme sequences such as babble, phoneme libraries, lingo sequences, language "lingo" libraries, into the removable storage 437. Information such as phoneme sequences, phoneme libraries and lingo sequences may be read from the lingo repository 415 of server 409 by the personal computer 419.

The wireless interface 439 may be an integrated wireless card or a plug-in wireless card such as a wireless fidelity (WiFi) card. The wireless interface may be compatible with protocols such as Bluetooth, 802.11a, 802.11b and 802.11g. The wireless communication interface 439 of the computer 419 may be adapted to provide a wireless communication link 459 for communicating with one or more devices. For example, wireless communication interface 439 may facilitate wireless communication with the remote device or controller device 427 via the wireless communication link 459.

The remote device or controller device 427 may be a handheld device 427 and may include a wireless interface 429. The remote device or controller device 427 may also be coupled to the computer via a wired link 445. The wired link 445 may be a Bluetooth or an 802.11x based link. The remote device or controller device 427 may also be adapted to receive removable storage shipped by removable storage shipping 417.

The first toy 431 resembling the bear and a second toy 433 resembling the human may be adapted to communicate with the personal computer 419 via a wired and/or a wireless interface. Additionally, media containing data and/or code may be transported between the personal computer 419, the first toy 431 and the second toy 433. The first toy 431 and/or the second toy 433 may include a removable storage, for example, that may be utilized to facilitate the transfer of information with the personal computer 419.

In one embodiment of the invention, a user may utilize the personal computer 419 to purchase babble or lingo from the server 409 and the purchased babble or lingo may be downloaded to the end user's computer 419. Accordingly, various user interfaces may be displayed on the monitor 425 and may be utilized to facilitate the purchasing of babble or lingo. In addition, the auditory training network 405 may also comprise a network such as the Internet 407. The server 409 and personal computer 419 may each be coupled to the network 407, which may be utilized to transfer information between the personal computer 419, the external storage/recording unit 437, the server 409 and the removable storage/shipping unit 417.

In accordance with an embodiment of the invention, the personal computer 419 may be connected to the server 409 via the Internet 407 or the personal computer 419 may be connected directly to the server 409 via a wired or wireless connection 453. Notwithstanding, the personal computer 419 may have the capability to download babble such as phoneme sequences, phoneme libraries, lingo sequences, language "lingo" libraries, for example, from the server 409. Help instructions may also be downloaded from the server 409 by the personal computer 419.

In an exemplary embodiment of the invention, a user may logon to the server 409 via the Internet 407 and download desired phoneme sequences, phoneme libraries, lingo sequences and/or language "lingo" libraries, for example, from the server 409 after purchasing them. The user may subsequently transfer the downloaded phoneme sequences, phoneme libraries, lingo sequences and/or language "lingo" libraries, for example, to a removable storage 437 via the external storage recording unit 435 The removable storage 437 may subsequently be plugged into the first toy 431 and/or the second toy 433. The first toy 431 and/or the second toy 433 may then be utilized for facilitating the selective playback of phoneme sequences, phoneme libraries, lingo sequences and/or language "lingo" libraries, for example.

Although the first toy 431 or bear toy 431 may be initialized to be a "babble" bear with babble downloaded from the server 409 via the computer 419, its status or identity may subsequently be changed. In this regard, the first toy 431 or bear toy 431 may subsequently be reinitialized or updated by the user to be a "lingo" bear after downloading a lingo sequence from the server 409 via the computer 419 and communication link 447. In general, a user may determine a status of a toy and, at any time, change the identity of a toy in order to satisfy a desire of the user.

Figure 5:
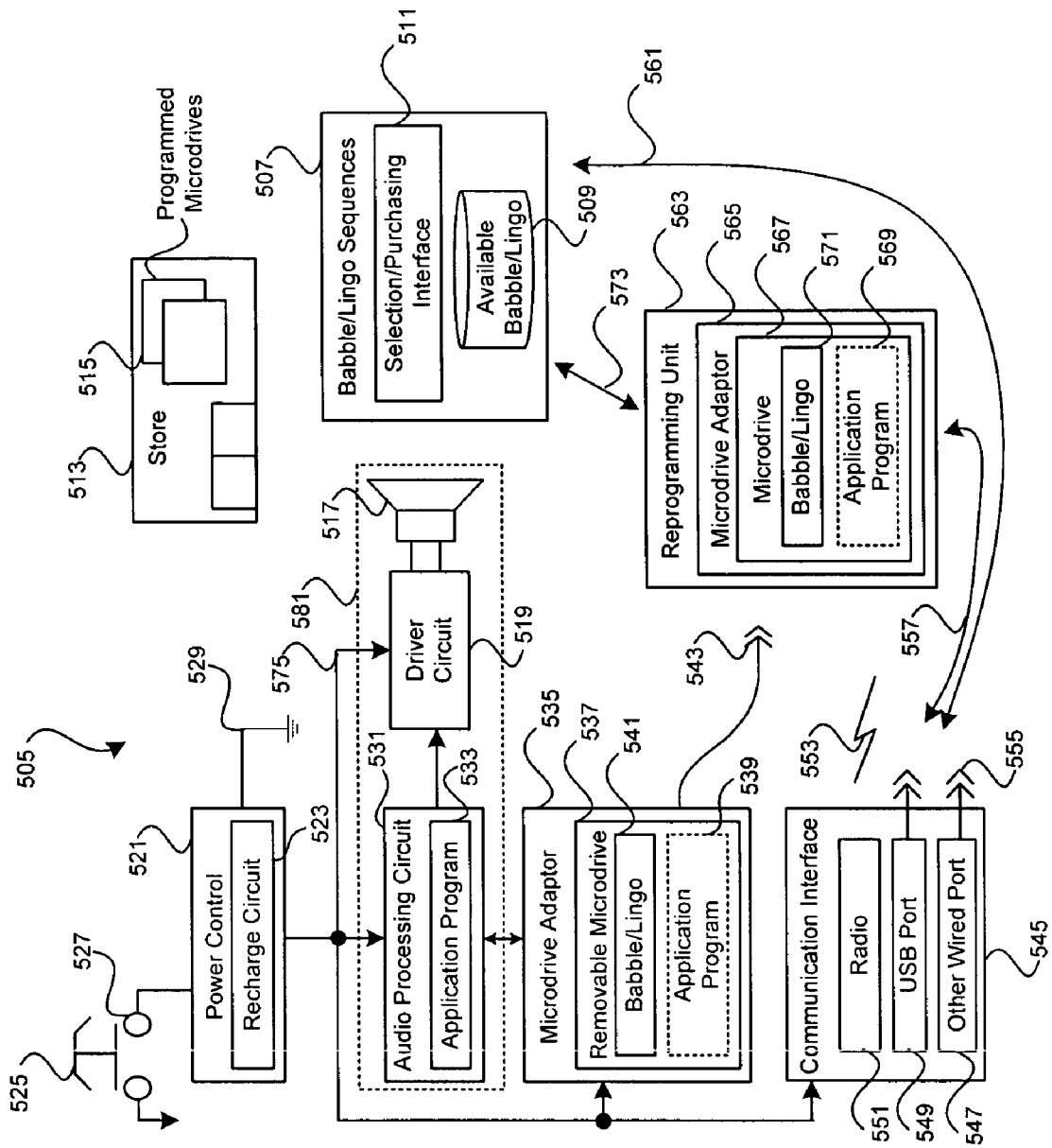
FIG. 5 is a perspective diagram of an of an auditory training network in accordance with an embodiment of the invention.

FIG. 5 is a perspective diagram of an auditory training network 505 in accordance with an embodiment of the invention. Referring to FIG. 5, the auditory training network 505 may comprise a babble/lingo sequence server 507, a communication interface 545, a power control 521, a reprogramming unit 563, an audio device 581, a microdrive adaptor 535 and a button or a switch 525. The reprogramming unit 563 may be communicatively coupled with the babble/lingo sequences server 507.

The babble/lingo sequences server 507 may comprise a selection/purchasing interface 511 and a database of available babble/lingo 509. The audio device 581 may comprise a processing circuit 531, a driver circuit 519 and a speaker 517. The power control unit 521 may comprise a recharge circuit 523. A button or a switch 525 and contacts 527 may be coupled to the power control unit 521.

The communication interface may include a wireless radio block 551, a USB port 549 and a miscellaneous port referred to as "other wired port" 547. The miscellaneous port 547 may be an IEEE 1394 Firewire port, for example. The wireless radio 551 block may provide wireless communication between, for example, the audio device 581 and/or the reprogramming unit 563. In this regard, the wireless radio may be adapted to support Bluetooth and/or any 802.11x based protocol such as 802.11a, 802.11b and/or 802.11g.

The power control 521 with a recharge circuit 523 may be configured to provide power to the processing circuit 533, the driver circuit 519, the microdrive adaptor 535 and/or the communication interface 545.

The reprogramming unit 563 may comprise a microdrive adaptor 565 for programming a microdrive 567 with a babble/lingo sequence 571 and/or an application program 569. Although a microdrive adapter is illustrated, the invention is not so limited. Accordingly, other adapters or storage devices may be utilized such as a compact FLASH card and a secure digital (SD) card. These other adapters may be utilized along with or in lieu of the microdrive adaptor 565. The reprogramming unit 563 may be referred to as a reader/writer and may be a multiport device in accordance with an embodiment of the invention. In this regard, the multiport reader/writer may have the capability to read and/or write from and/or to a plurality of media storage device types. For example, a single multiport reader/writer device may be adapted to read and write to secure digital (SD) cards, microdrives, compact flash cards, and memory sticks™. As new port types are developed, the single multiport reader/writer may be adapted to handle these new port types.

The audio processing circuit 531 may selectively execute one or more application programs 533 and manipulate the driver circuit 519, thereby causing the driver circuit to generate audio signals for playing babble/lingo sequences on the speaker unit 517 to which the driver is communicatively coupled. The processing circuit 531 may selectively retrieve babble/lingo and/or associated application program 539 from the removable microdrive 537 plugged into microdrive adaptor 535 to which the processing circuit 531 is communicatively coupled. In the case of a multiport reader/writer device, the audio processing circuit 531 may retrieve babble/lingo and/or associated application program 539 from any media that may be plugged into the multiport reader/writer device.

In general, during operation, the audio device 581 may selectively retrieve babble/lingo from the babble/lingo sequences server 507 or the reprogramming unit 563 by utilizing one of several available communication mechanisms such as a radio link 551, a USB port 549 and an other wired port 547. Since the reprogramming unit 563 is communicatively coupled with the babble/lingo sequences server 507, it can selectively retrieve babble/lingo from the babble/lingo sequences server 507. In one aspect of the invention, programmed microdrives 515 that may be sold in stores 513, via mail order or via the Internet may be acquired and plugged into the microdrive adaptor 535 for subsequent access and selective playback by the processing circuit 531. The same may be true for other media types containing babble/lingo sequences.

Figure 6:
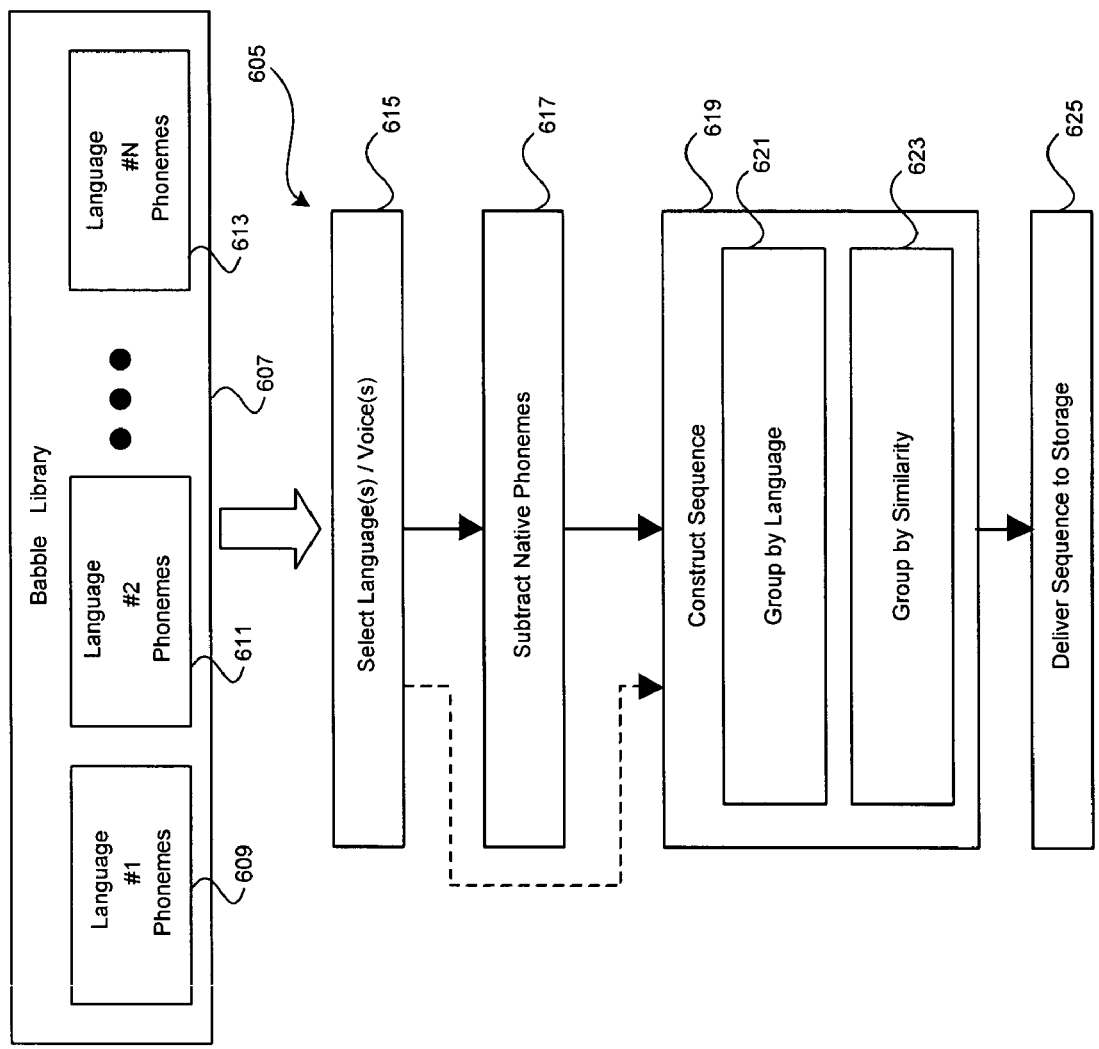
FIG. 6 is a flowchart of an exemplary operation of the processing circuit employed by the audio processing unit of FIG. 1 and the audio processing circuit of FIG. 5, in accordance with an embodiment of the invention.

FIG. 6 is a flowchart 605 of an exemplary operation of the processing circuit employed by the audio processing unit 113 of FIG. 1 and the audio processing circuit 531 of FIG. 5, in accordance with an embodiment of the invention. Referring to FIG. 6, there is shown a babble library 607 which may provide a plurality of language phonemes, such as language #1 phonemes 609, language #2 phonemes 611, . . . , and language #N phonemes 613. The babble library 607 may also be adapted to facilitate selection and retrieval of the language phonemes by the processing circuit. When playing back retrieved phonemes and languages, it is possible to include or exclude phonemes, words and/or phrases that may be found in a default language. The default language may be a native language or the first language of a user. Additionally, it may also be possible to select one or more languages from a plurality of available languages. Furthermore, a choice of voice type such as male, female, child or adult may be presented to the user. The user may then select a voice type that best matches their voice or needs.

Referring to FIG. 6, in step 615, the processing circuit may enable selection of one or more languages/voice(s) for playback. In step 617, the phonemes found in the native language for the user or the phonemes that are considered part of a default set of phonemes may be selectively subtracted. Notwithstanding, in step 619, phoneme sequences may generally be selectively constructed. In step 621, which may be a sub-step of step 619, sequences of phonemes may be grouped by language. In step 623, which is a sub-step of step 619, sequences of phonemes may be grouped by similarity. Subsequently, in step 625, the constructed sequence may be delivered to a storage for subsequent processing and/or playback.

In one embodiment of the invention, in step 615 where the selection of languages or voices may be handled, the phonemes from a user's native language or the default language are not excluded or subtracted and the construction of phoneme sequences proceeds at the next step 619 for subsequent storage and/or playback. In other words, step 617 may be an optional step and in cases where it is not necessary to subtract native phonemes, then step 617 is eliminated and execution flows from step 615 directly to step 619.

Figure 7:
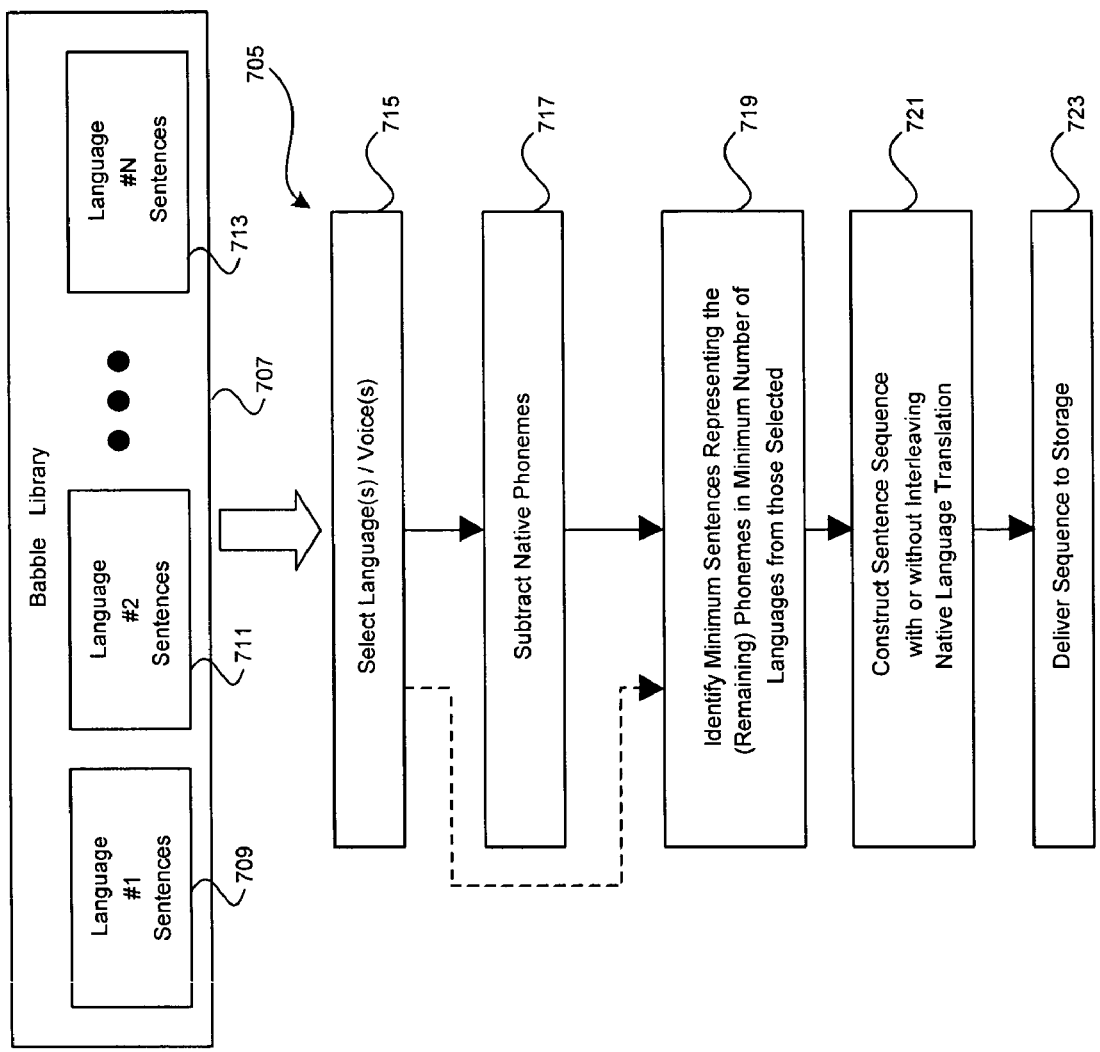
FIG. 7 is a flowchart of an exemplary operation of the processing circuit employed in audio process of FIG. 1 and the processing circuit of FIG. 5 wherein language sentences are stored, retrieved from a babble library and played back by the processing circuit, in accordance with an embodiment of the invention.

FIG. 7 is a flowchart of an exemplary operation of the processing circuit employed in audio processing unit 113 of FIG. 1 and the processing circuit 531 of FIG. 5 wherein language sentences are stored, retrieved from a babble library 707 and played back by the processing circuit, in accordance with an embodiment of the invention. In this regard, language sentences retrieved from a babble library 707 may be played back by other associated elements and sentences from non-native or default languages may be selectively presented with or without native language translation.

The babble library 707 may provide a plurality of language sentences, such as language #1 sentences 709, language #2 sentences 711, . . . , and language #N sentences 713, etc. The babble library 707 may also be adapted to facilitate selection and retrieval of the language sentences by the processing circuit. When playing back retrieved sentences for one or more languages, it may be possible to include or exclude sentences, words and/or phrases that may be part of a default language. The default language may be a native language or a first language of the user. Additionally, it may also be possible to select one or more languages from a plurality of available languages. Furthermore, a choice of voice type such as male, female, child or adult may be presented to the user. Accordingly, the user may select a voice type that best matches their voice or needs.

Referring to FIG. 7, in step 715, the processing circuit may enable selection of one or more languages/voice(s) for playback. In step 717, sentences with phonemes found in the subject's native language or the sentences with a significant number of phonemes that are considered part of a default set of phonemes for the subject's language or default language may be selectively subtracted. In step 719, sequences of sentences may be identified that represent minimum sentences with the remaining phonemes that are not represented in the subject's native language. Thus sentences may be selected in each of the selected languages that contain phonemes that are not represented in the native language of the user.

In step 721, sentence sequences may be selectively constructed and the constructed sequences may be presented with or without interleaving native language translations of such sentences. Subsequently, in step 723, the constructed sequence of sentences may be delivered to a storage for subsequent processing and/or playback.

In one embodiment of the invention, in step 715 where the selection of languages or voices may be handled, the phonemes from a users native language or the default language are not excluded or subtracted and the construction of phoneme sequences proceeds at the next step 719 for subsequent storage and/or playback. In other words, step 717 may be an optional step and in cases where it is not necessary to subtract native phonemes, then step 717 is eliminated and execution flows from step 715 directly to step 719.

Figure 8:
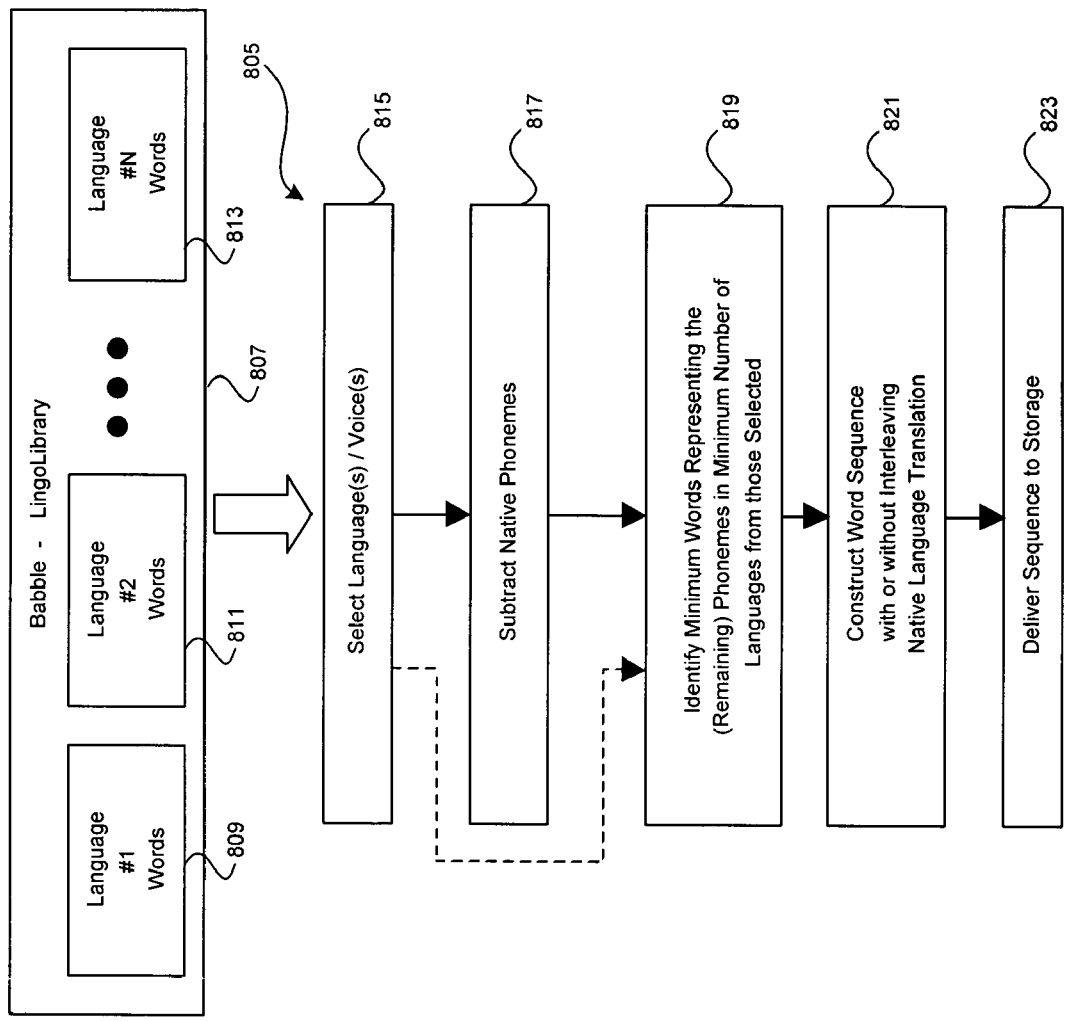
FIG. 8 is a flowchart of an exemplary operation of the processing circuit employed in audio processing unit of FIG. 1 and the processing circuit of FIG. 5 wherein language sentences are stored, retrieved from a babble-lingo library and played back by the processing circuit, in accordance with an embodiment of the invention.

FIG. 8 is a flowchart of an exemplary operation of the processing circuit employed in audio processing unit 113 of FIG. 1 and the processing circuit 531 of FIG. 5 wherein language sentences are stored, retrieved from a babble-lingo library 807 and played back by the processing circuit, in accordance with an embodiment of the invention. The language sentences that are retrieved from a babble-lingo library 807 may also be played back by other associated elements and sentences from non-native or default languages may be selectively presented with or without native language translation.

Referring to FIG. 8, there is shown a babble-lingo library 807 that may provide a plurality of language words and sentences, such as language #1 words 809, language #2 words 811, . . . , and language #N words 813. The babble-lingo library 807 may also facilitate selection and retrieval of the language words by the processing circuit. When playing back retrieved words or sentences for one or more languages, it is possible to include or exclude sentences, words and/or phrases that are to be found in a default language. The default language may be a native language or a first language of the user. Additionally, it may also be possible to select one or more languages from a plurality of available languages. Furthermore, a choice of voice type such as male, female, child or adult may be presented to the user. Accordingly, the user may then select a voice that best matches their voice or needs.

Referring to FIG. 8, in step 815, the processing circuit enables selection of one or more languages/voice(s) for playback. In step 817, the sentences with words are found in the subject's native language or the sentences with a significant number of words that are considered part of a default set of words for the subject's language or default language are selectively subtracted. In step 819, sequences of words are identified that represent minimum words with the remaining phonemes that are not represented in the subject's native language. In this regard, words may be selected in each of the selected languages that contain phonemes that are not represented in the native language of the user. In addition, a minimum number of languages may also be selectively identified that contains the minimum set of phonemes.

In step 821, word sequences may be selectively constructed and the word sequences selectively presented with or without interleaving native language translations of such words. Finally, in step 823, the constructed sequence of words and/or phrases may be delivered to a storage for subsequent processing and/or playback.

In one embodiment of the invention, in step 815 where the selection of languages or voices may be handled, the phonemes from a user's native language or the default language are not excluded or subtracted and the construction of phoneme sequences proceeds at the next step 819 for subsequent storage and/or playback. In other words, step 817 may be an optional step and in cases where it is not necessary to subtract native phonemes, then step 817 is eliminated and execution flows from step 815 directly to step 819.

Figure 9:
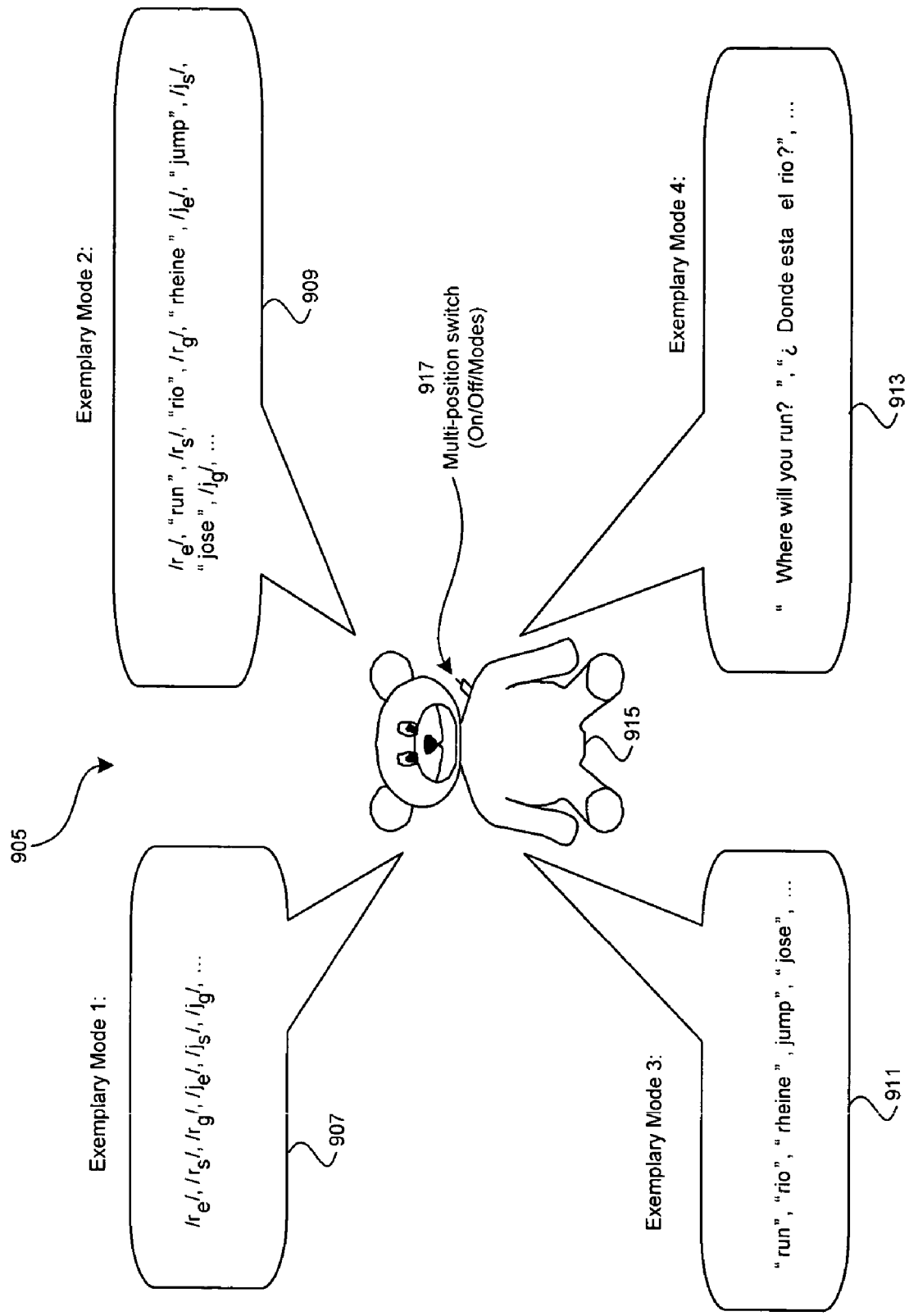
FIG. 9 is a diagram illustrating various exemplary modes of operation for a toy depicted as a "babble-lingo" bear, in accordance with an embodiment of the invention.

FIG. 9 is a diagram illustrating various exemplary modes of operation for a toy depicted as a "babble-lingo" bear 915, in accordance with an embodiment of the invention. Referring to FIG. 9, there is shown a multi-position switch 917 that may include various operational modes such as on; off and a plurality of other operation modes—on/off/modes. The modes position may represent, for example, babble mode with phonemes 907, lingo-mode with words and phrases 911, a combination of babble mode and lingo mode in multiple languages 909, a lingo-mode with complete sentences and interleaving translation into a native language.

In accordance with an exemplary embodiment of the invention, the exemplary mode 1, referenced as 907, depicts a scenario in which the babble bear 915 operates in a mode that is more appropriate for infants learning to speak basic phonemes at a rudimentary level. In this regard, an infant may be provided with a range of phonemes that are either representative of a native language, alien to a native language, or a combination thereof. Exemplary mode 2, referenced as 909, depicts a scenario which may be appropriate for infants learning basic words in addition to sounding out phonemes. In this regard, the infants are presented with a range of phonemes and words that are either representative of the phonemes and words in a native language, alien to a native language or a combination thereof. In addition, translations of normative words into native words may be selectively provided in an interleaving fashion.

Exemplary mode 3, referenced as 911, depicts a scenario which may be appropriate for infants and toddlers learning basic words. When activated in this mode, the infants are presented a range of words that are either representative of the words in a native language, alien to a native language or a combination thereof. In addition, translations of non-native words into native words may be selectively provided in an interleaving fashion when non-native words are to be presented. Exemplary mode 4, references as 913, depicts a scenario which may be appropriate for toddlers learning sentence structures and construction of sentences. When activated in this mode, such infants and toddlers are presented a range of sentences that are either representative of the words in a native language or those that are alien to a native language or a combination of the two. In addition, translations of non-native sentences into sentences in a native language or first language are selectively provided in an interleaving fashion when non-native sentences are to be presented.

In accordance with an embodiment of the invention, the phoneme playback system, which may be utilized to enhance language learning skills, may be incorporated into a battery operated "reading" book that provides pages of text and pictures that can be read and listened to. In this regard, buttons or a touch sensitive switch may activate the playback of audio output of relevant sections of the book. The user of the book may be given an option to choose a voice type for playback such as male, female, child or adult. Other parameters such as speed and pitch may also be adjusted. The audio output may be a translation of the relevant section of content from the book into a language which differs from the language in which the relevant section of the book is printed or presented.

In an embodiment of the invention, with reference to FIG. 1, at least one event may be received by a trigger unit 127 of an audio enabled toy. In response to the triggering event, an audio processing unit 113 within the audio enabled toy, may select a phoneme and/or a lingo from a first removable storage of the audio enabled toy that corresponds to the received event. The received event may be at least one of a motion trigger 127, a sound trigger 129 and a button trigger 131 and the phoneme and/or lingo may be associated with a first language. An audio representation of the selected phoneme and/or lingo may be generated by the audio processing unit 113 within the audio enabled toy. The generated audio representation of the selected phoneme and/or lingo may be played by the audio processing unit 113 from within the audio enabled toy.

In accordance with an embodiment of the invention, a duration, a pitch, a volume and/or a speed characterizing the playing of the generated audio may be adjusted by the audio processing unit 113 from within the audio enabled toy. Additionally, at least one of a voice type corresponding to an infant, a toddler, a teenager, an adult, a male and/or a female may be selected by the audio processing unit 113 from within the audio enabled toy for playing the generated audio for the selected phoneme and/or lingo. Phonemes and/or lingos that are native to the first language may be excluded or extracted by the audio processing unit 113 prior to playing the generated audio.

The first removable storage may be replaced with a second removable storage comprising at least a phoneme and/or a lingo corresponding to a second language. A phoneme and/or a lingo corresponding to a second language may be selected from within the audio enabled toy by the audio processing unit 113 from at least two removable storages that are simultaneously coupled to and within the audio enabled toy. Phonemes and/or lingos may be downloaded by the audio enabled toy from a remote server (409), a remote storage (441) and/or a personal computer (419). A communication interface 115 may be adapted to facilitate the download. In this regard, downloading from within an audio enabled toy may occur via a wired and/or a wireless interface since the communication interface 115 may possess wired and/or wireless capability.

Certain embodiments of the invention provide a method and apparatus for aiding language pronunciation. An aspect of the method may comprise receiving at least one event by an audio enabled toy and selecting within the audio enabled toy, a phoneme and/or a lingo from a first removable storage of the audio enabled toy that corresponds to the received event. The phoneme and/or lingo may be associated with a first language. An audio representation of the selected phoneme and/or lingo may be generated within the audio enabled toy. The generated audio representation of the selected phoneme and/or lingo may be played from within the audio enabled toy.

In accordance with an embodiment of the invention, a duration, a pitch, a volume and a speed of the playing of the generated audio representation may be adjusted from within the audio enabled toy. Additionally, at least one of a voice type corresponding to an infant, a toddler, a teenager, an adult, a male and/or a female may be selected within the audio enabled toy for playing the generated audio representation of the selected phoneme and/or lingo. Phonemes and/or lingos that are native to the first language may be excluded prior to playing the generated audio.

The first removable storage may be replaced with a second removable storage comprising at least a phoneme and/or a lingo corresponding to a second language. A phoneme and/or a lingo corresponding to a second language may be selected from within the audio enabled toy from at least two removable storages simultaneously coupled within an audio enabled toy. Phonemes and/or lingos may be downloaded by the audio enabled toy from a remote server, a remote storage and/or a personal computer. In this regard, downloading from within an audio enabled toy may occur via a wired and/or a wireless interface. The received event may be at least one of a motion trigger, a sound trigger and a button trigger.

Another embodiment of the invention may provide a machine-readable storage, having stored thereon, a computer program having at least one code section for aiding language pronunciation. The at least one code section may be executable by a machine, thereby causing the machine to perform the steps as described above for aiding language pronunciation.

An aspect of the apparatus may comprise a trigger unit within an audio enabled toy that receives at least one event and an audio processing unit that selects from within the audio enabled toy, a phoneme and/or a lingo from a first removable storage of the audio enabled toy that corresponds to the received event. The phoneme and/or lingo may be associated with a first language. The received event may be at least one of a motion trigger, a sound trigger and a button trigger. An audio representation of the selected phoneme and/or lingo may be generated within the audio enabled toy by the audio processing unit. The generated audio representation of the selected phoneme and/or lingo may be played from within the audio enabled toy by the audio processing unit.

In accordance with an embodiment of the invention, a duration, a pitch, a volume and a speed of the playing of the generated audio representation may be adjusted from within the audio enabled toy by the audio processing unit. Additionally, at least one of a voice type corresponding to an infant, a toddler, a teenager, an adult, a male and/or a female may be selected from within the audio enabled toy by the audio processing unit and utilized for playing the generated audio representation of the selected phoneme and/or lingo. Phonemes and/or lingos that are native to the first language may be excluded by the audio processing unit prior to playing the generated audio.

The first removable storage may be replaced with a second removable storage comprising at least a phoneme and/or a lingo corresponding to a second language. The audio processing unit may allow a phoneme and/or a lingo corresponding to a second language to be selected from within the audio enabled toy from at least two removable storages that are simultaneously coupled within an audio enabled toy. With the aid of a communication interface, phonemes and/or lingos may be downloaded by the audio enabled toy from a remote server, a remote storage and/or a personal computer. In this regard, downloading via the communication interface from within an audio enabled toy may occur in a wired and/or a wireless manner.

Another embodiment of the invention for aiding language pronunciation may comprise receiving at least one triggering event by an audio enabled toy and generating from within said audio enabled toy, audio signals representative of a plurality of phonemes for a native language and a plurality of phonemes for at least one non-native language. Sound corresponding to the generated audio signals may be played from within the audio enabled toy. Also, at least a portion of the plurality of the phonemes for the at least one non-native language may comprise phonemes that are not common with phonemes of the native language.

A further embodiment of the invention for aiding language pronunciation may comprise receiving at least one triggering event by an audio enabled toy and generating from within the audio enabled toy, audio signals representative of phonemes for a non-native language, wherein at least a portion of the phonemes for the non-native language comprises phonemes that are not in common with any phonemes of a native language. Sound corresponding to the generated audio signals may be played from within the audio enabled toy.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for aiding language pronunciation, the method comprising:
   receiving at least one event by an audio enabled toy;
   selecting from within said audio enabled toy, a plurality of phonemes from a first storage of said audio enabled toy that corresponds to said at least one received event, said plurality of phonemes consisting of phonemes for at least one non-native language that by themselves do not form a word and are not in common with any of a plurality of phonemes for a native language; and
   generating within said audio enabled toy, an audio representation of said selected plurality of phonemes.

2. The method according to claim 1, further comprising playing from within said audio enabled toy, said generated audio representation of said selected plurality of phonemes.

3. The method according to claim 2, further comprising at least one of:
   adjusting from within said audio enabled toy, at least one of a duration, a pitch, a volume and a speed of said playing of said generated audio representation; and
   selecting from within said audio enabled toy, at least one of voice type corresponding to an infant, a toddler, a teenager, an adult, a male and a female for said playing of said generated audio representation.

4. The method according to claim 2, further comprising excluding said plurality of phonemes for said native language prior to said playing.

5. The method according to claim 1, wherein said first storage comprises a first removable storage, and further comprising receiving by the audio enabled toy a second removable storage that replaces or is in addition to said first removable storage, said second removable storage comprising a second plurality of phonemes at least partially different from said plurality of phonemes stored on said first removable storage.

6. The method according to claim 1 wherein said first storage comprises a first removable storage, and further comprising selecting from within said audio enabled toy, said plurality of phonemes from at least two removable storages simultaneously coupled to said audio enabled toy.

7. The method according to claim 1, further comprising downloading from within an audio enabled toy, said plurality of phonemes from at least one of a remote server, a remote storage and a personal computer, said downloading occurring via at least one of a wired and a wireless interface.

8. The method according to claim 1, wherein said received at least one event is at least one of a motion trigger, a sound trigger and a buff on trigger.

9. A method for aiding language pronunciation, the method comprising: receiving at least one triggering event by an audio enabled toy; and generating from within said audio enabled toy, audio signals representative of:
   a plurality of phonemes consisting of phonemes for at least one non-native language that by themselves do not form a word and are not in common with any of a plurality of phonemes for a native language.

10. The method according to claim 9, further comprising playing from within said audio enabled toy, sound corresponding to said generated audio signals.

11. The method according to claim 9, comprising generating within said audio enabled toy, audio signals representative of a plurality of phonemes for said native language.

12. A method for aiding language pronunciation, the method comprising:
   receiving at least one triggering event by an audio enabled toy; and
   generating by said audio enabled toy, audio signals representative of phonemes for a non-native language, wherein said phonemes for said non-native language consists of phonemes that by themselves do not form a word and are not in common with any phonemes of a native language.

13. The method according to claim 12, further comprising playing from within said audio enabled toy, sound corresponding to said generated audio signals.

14. An apparatus for aiding language pronunciation, the apparatus comprising:
   a trigger unit that receives at least one event by an audio enabled toy;

an audio processing unit that selects from within said audio enabled toy, a plurality of phonemes from a first storage of said audio enabled toy that corresponds to said at least one received event, said plurality of phonemes consisting of phonemes for at least one non-native language that by themselves do not form a word and are not in common with any of a plurality of phonemes for a native language; and said audio processing unit generates within said audio enabled toy, an audio representation of said plurality of phonemes.

15. The apparatus according to claim 14, wherein said audio processing unit plays from within said audio enabled toy, said generated audio representation of said selected plurality of phonemes and said received at least one event is at least one of a motion trigger, a sound trigger and a button trigger.

16. The apparatus according to claim 15, wherein said audio processing unit at least one of: adjusts from within said audio enabled toy, at least one of a duration, a pitch, a volume and a speed of said playing of said generated audio representation; and selects from within said audio enabled toy, at least one of voice type corresponding to an infant, a toddler, a teenager, an adult, a male and a female for said playing of said generated audio representation.

17. The apparatus according to claim 15, wherein said audio processing unit excludes said plurality of phonemes for said native language prior to said playing.

18. The apparatus according to claim 14, wherein said first storage comprises a first removable storage, and said audio processing unit receives a second removable storage that replaces or is in addition to said first removable storage, said second removable storage comprising a second plurality of phonemes at least partially different from said plurality of phonemes stored on said first removable storage.

19. The apparatus according to claim 14, wherein said audio processing unit selects from within said audio enabled toy, said plurality of phonemes from at least two removable storages simultaneously coupled to said audio enabled toy.

20. The apparatus according to claim 14, wherein said audio processing unit downloads from within an audio enabled toy, said plurality of phonemes from at least one of a remote server, a remote storage and a personal computer, wherein said downloading occurs via at least one of a wired and a wireless interface.

21. The method according to claim 1, wherein said plurality of phonemes comprises said plurality of phonemes for a native language.

22. The method according to claim 1, wherein said first storage comprises a first removable storage.

23. The method according to claim 14, wherein said plurality of phonemes comprises said plurality of phonemes for a native language.

24. The method according to claim 14, wherein said first storage comprises a first removable storage.

25. An apparatus for aiding language pronunciation, the apparatus comprising:
at least one trigger; and
at least one circuit responsive to said at least one trigger to generate from within said apparatus audio signals representative of a plurality of phonemes consisting of phonemes for at least one non-native language that by themselves do not form a word and are not in common with any of a plurality of phonemes for a native language.

26. The apparatus according to claim 25, further comprising a speaker for playing sound corresponding to said generated audio signals.

27. The apparatus according to claim 25, wherein said at least one circuit is responsive to said at least one trigger to enable generation of audio signals representative of said plurality of phonemes for said native language.

28. An apparatus for aiding language pronunciation, the apparatus comprising:
at least one trigger; and
at least one circuit that enables generation of audio signals representative of phonemes for a non-native language, wherein said phonemes for said non-native language consists of phonemes that by themselves do not form a word and are not in common with any phonemes of a native language.

29. The apparatus according to claim 28, further comprising a speaker for playing sound corresponding to said generated audio signals.

30. The apparatus according to claim 28, wherein said at least one circuit enables generation of audio signals representative of said phonemes of said native language.

* * * * *